United States Patent
Washington et al.

(10) Patent No.: US 9,639,237 B2
(45) Date of Patent: May 2, 2017

(54) USER-CUSTOMIZABLE CONTEXT MENUS

(75) Inventors: David Earl Washington, Seattle, WA (US); Lyon Wong, Issaquah, WA (US); Aryeh N. Polsky, Seattle, WA (US); Tira L. Cohene, Seattle, WA (US); David Burg, Newcastle, WA (US); Brendan M. Dohm, Seattle, WA (US); Jason A. Christensen, Kirkland, WA (US); Adam C. Lusch, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 353 days.

(21) Appl. No.: 12/914,872

(22) Filed: Oct. 28, 2010

(65) Prior Publication Data

US 2012/0110507 A1 May 3, 2012

(51) Int. Cl.
*G06F 3/0482* (2013.01)
*G06F 3/0484* (2013.01)

(52) U.S. Cl.
CPC .......... *G06F 3/0482* (2013.01); *G06F 3/0484* (2013.01); *G06F 3/04842* (2013.01)

(58) Field of Classification Search
CPC ...... G06F 3/048; G06F 3/0481; G06F 3/0482; G06F 9/4443; G06F 8/38; G06F 3/0484; G06F 3/04842; H04N 5/44543
USPC .......... 715/764, 810, 825, 826, 840
See application file for complete search history.

(56) References Cited

U.S. PATENT DOCUMENTS

| | | | |
|---|---|---|---|
| 5,625,783 A | | 4/1997 | Ezekiel et al. |
| 5,664,133 A | * | 9/1997 | Malamud et al. ............ 715/816 |
| 5,828,376 A | * | 10/1998 | Solimene et al. ............ 715/821 |
| 5,852,441 A | * | 12/1998 | Nakajima et al. ............ 715/866 |
| 6,239,802 B1 | * | 5/2001 | Lahey ................... G06F 9/4443 707/999.2 |
| 6,278,450 B1 | | 8/2001 | Arcuri et al. |
| 7,246,329 B1 | * | 7/2007 | Miura et al. ................. 715/810 |
| 7,487,466 B2 | * | 2/2009 | Peters ........................... 715/808 |
| 7,533,352 B2 | * | 5/2009 | Chew et al. .................. 715/781 |
| 7,661,088 B2 | | 2/2010 | Burke |
| 7,788,597 B1 | * | 8/2010 | Mazhar et al. .............. 715/810 |
| 2005/0039141 A1 | * | 2/2005 | Burke et al. ................. 715/810 |
| 2005/0091641 A1 | * | 4/2005 | Starbuck et al. ............. 717/122 |
| 2005/0262481 A1 | | 11/2005 | Coulson |

(Continued)

FOREIGN PATENT DOCUMENTS

| CN | 1790242 | 6/2006 |
|---|---|---|
| CN | 101071361 | 11/2007 |
| CN | 101676850 | 3/2010 |

OTHER PUBLICATIONS

Tanmay Ahmed, "Customize the Right Click Menu in Windows 7," Dec. 22, 2009, maketecheasier.com, pp. 1-8.*

(Continued)

*Primary Examiner* — Nicholas Ulrich
(74) *Attorney, Agent, or Firm* — Klarquist Sparkman, LLP

(57) ABSTRACT

Context menus are described. In one or more implementations, an option is displayed in a user interface by a computing device, the option selectable to cause a representation of an object to be added to a context menu. In response to selection of the option, the context menu is configured by the computing device to include the representation of the object such that the representation of the object is selectable to launch the object by the computing device.

22 Claims, 6 Drawing Sheets

(56) References Cited

U.S. PATENT DOCUMENTS

| | | | | |
|---|---|---|---|---|
| 2005/0273729 | A1* | 12/2005 | Kumashio | 715/825 |
| 2007/0157125 | A1* | 7/2007 | Peters | 715/837 |
| 2007/0250793 | A1* | 10/2007 | Miura | G06F 3/0482 715/810 |
| 2008/0222569 | A1* | 9/2008 | Champion | G06F 3/0482 715/834 |
| 2009/0100321 | A1 | 4/2009 | Singh et al. | |
| 2010/0011319 | A1* | 1/2010 | Gourdol et al. | 715/810 |
| 2010/0257479 | A1* | 10/2010 | Do et al. | 715/780 |
| 2011/0060995 | A1* | 3/2011 | Whalen et al. | 715/736 |
| 2011/0265035 | A1* | 10/2011 | Lepage et al. | 715/810 |

OTHER PUBLICATIONS

Daniel Petri, "Add Command Prompt Here Shortcut to Windows Explorer," Jan. 7, 2009, petri.co.il, pp. 1-4.*
Matthew DeCarlo, "Access and Customize Windows 7's Extended Context Menu," Oct. 23, 2009, techspot.com, pp. 1-4.*
Peter Butler, "Cusomize your Windows right-click menu," Feb. 19, 2008, cnet.com, pp. 1-9.*
"Top 10 Right-Click Tools," Sep. 17, 2008, lifehacker.com, pp. 1-4.*
"How to Add Items to the Right-Click Menu in Nautilus," Mar. 2, 2009, techthrob.com, pp. 1-8.*
Susan Harkins, "10 commands you may want to add to the Office 2007 Quick Access Toolbar," Nov. 24, 2008, techrepublic.com, pp. 1-5.*
"Customize the Quick Access Toolbar," Jul. 20, 2010, office.microsoft.com, pp. 1-3.*
"Customizing Office 2007 and the Quick Access Toolbar," Jan. 28, 2009, wikispaces.psu.edu, pp. 1-2.*
"Microsoft Office 2010 Quick Access Toolbar—quick tips," May 8, 2010, rhftech.com, pp. 1-4.*
Rick Broida, "Add Features to Office 200Ts Quick Access Toolbar," Mar. 11, 2009, pcworld.com, pp. 1-8.*
"How to Fix Slow Right Click Problems in Windows," Apr. 18, 2009, http://web.archive.org/web/20090418173816/http://www.watchingthenet.com/how-to-fix-slow-right-click-problems-in-windows.html, 13 pages.*
"User Interface customization", Retrieved at << http://www.zabkat.com/x2h_8.htm >>, Aug. 19, 2010, pp. 4.
"Add and Organize Commands and Controls on a Ribbon Panel", Retrieved at << http://docs.autodesk.com/ACD/2010/ENU/AutoCAD%202010%20User%20Documentation/index.html?url=WS1a9193826455f5ff-7c11d46c11c98c28daf-72f8.htm,topicNumber=d0e378285 >>, Aug. 20, 2010, pp. 3.
"Flexense—Storage Management Solutions", Retrieved at <<http://www.flexense.com/flextk/ >>, Aug. 19, 2010, pp. 2.
"Ribbon Feature Walkthrough", Retrieved at << http://windowsclient.net/wpf/wpf35/wpf-35sp1-ribbon-walkthrough.aspx >>, Aug. 20, 2010, pp. 7.
"Foreign Office Action", CN Application No. 201110334042.5, Dec. 4, 2013, 11 Pages.
"Foreign Office Action", CN Application No. 201110334042.5, Aug. 15, 2014, 15 Pages.
"Foreign Office Action", CN Application No. 201110334042.5, Mar. 4, 2015, 7 Pages.
Fourth Chinese Office Action, issued in corresponding China Patent Application No. 20110334042.5, dated Sep. 7, 2015, with English-language translation, 6 pages.
Notification of Grant (w/English Translation), received in counterpart Chinese Patent Application No. 201110334042.5, dated Jan. 20, 2016, 4 pages.

* cited by examiner

USER-CUSTOMIZABLE CONTEXT MENUS

BACKGROUND

The amount of functionality that is available to users of computing devices is ever increasing. For example, a user may have access to a wide range of computing devices, each configured to also include a wide range of different functionality that may be provided through an operating system of the device, applications that are executable on the device, involve management of files stored on the device, and so on. Consequently, users may be confronted with a multitude of different techniques that may be used to access this functionality, which may make it difficult and confusing to locate particular functionality of interest. Thus, the sheer amount of this functionality may make it difficult for a user to interact with the device, which may lead to user frustration both with the device and functionality added to the device.

SUMMARY

Context menus are described. In one or more implementations, an option is displayed in a user interface by a computing device, the option selectable to cause a representation of an object to be added to a context menu. In response to selection of the option, the context menu is configured by the computing device to include the representation of the object such that the representation of the object is selectable to launch the object by the computing device.

In one or more implementations, a representation of an object is displayed in a user interface by a computing device that is selectable using a first technique to launch the object by the computing device and a second technique to cause output of an option by the computing device. Responsive to detection of the selection of the representation of the object using the second technique, the option is displayed to be selectable in the user interface by the computing device to cause the representation of the object to be included in a context menu.

In one or more implementations, one or more computer readable storage media comprises instruction stored thereon that responsive to execution by a computing device, causes the computing device to perform operations that include displaying, in a file management user interface by a computing device, a representation of a command that is selectable using a first technique to initiate execution of the command by the computing device and a second technique to cause output of an option by the computing device. Responsive to detection of the selection of the representation of the command using the second technique, the option is displayed to be selectable in the user interface by the computing device. Responsive to detection of selection of the option, a context menu and a toolbar are configured by the computing device to each include a representation of the command that is selectable to initiate execution of the command.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The amount of functionality that is available to users of computing devices is ever increasing, so much so that location of desired functionality may be difficult and confusing to the users. For example, traditional techniques involving hierarchical menus may involve increasing the size of the menu as well as adding levels to the menus to accommodate commands and so forth. Thus, these traditional techniques may result in a confusing hierarchy that may be difficult to navigate.

Context menus are described. In one or more implementations, a customizable context menu is provided such that a user may "pin" desired objects (e.g., commands, files, and so on) to the context menu. For example, a user interface may be displayed that includes a menu system having representations of commands, such as a ribbon displayed near the top of the user interface. A user may use a cursor control device (e.g., a mouse, detection of a gesture, and so on) to perform a "right click" on a representation. The right click may be used to cause output of a menu that includes an option to have the command added for quick access.

One such way to provide quick access is to include the command in a context menu. Therefore, the command may be accessed by a subsequent right click in the user interface. The command may also be automatically added to a toolbar that is displayed near the top of the user interface independent of the ribbon. Therefore, a user may navigate through different portions of the ribbon, content in the user interface, and so on, yet is still is provided with quick access to the command from the context menu and/or the tool bar. Further discussion of these and other techniques may be found in relation to the following sections.

In the following discussion, an example environment is first described that is operable to perform techniques described herein. Examples procedures are then described, which are operable in the example environment as well as in other environments. Likewise, the example environment is not limited to performance of the example procedures.

Example Environment

Figure 1:
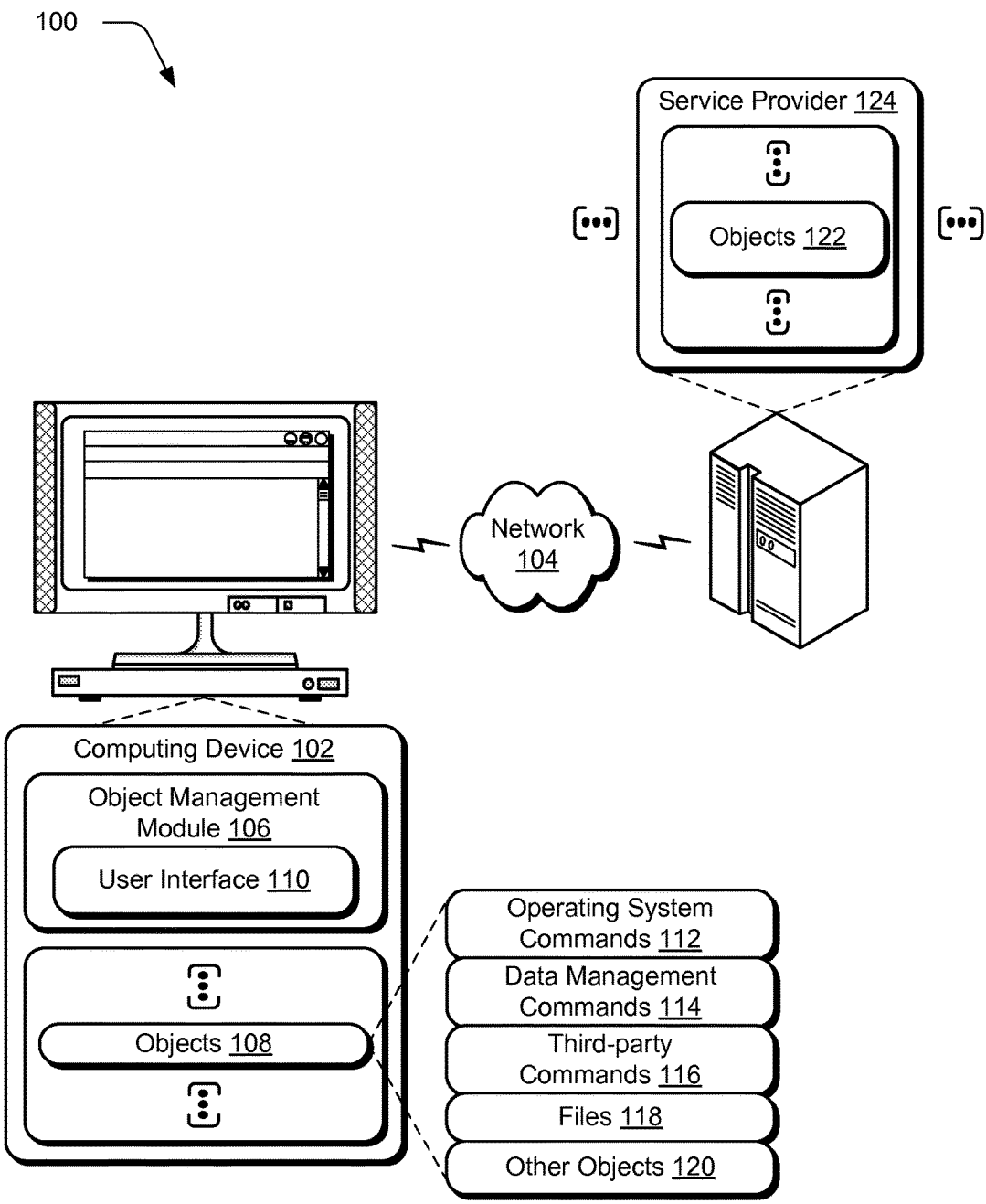
FIG. 1 is an illustration of an environment in an example implementation that is operable to perform techniques described herein.

FIG. 1 is an illustration of an environment 100 in an example implementation that is operable to employ context menu techniques. The illustrated environment 100 includes a computing device 102, which may be configured in a variety of ways. For example, the computing device 102 may be configured as a computer that is capable of communicating over a network 104, such as a desktop computer, a mobile station, an entertainment appliance, a set-top box communicatively coupled to a display device, a wireless phone, a game console, and so forth.

Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations, a remote control and set-top box combination, an image capture device and a game console configured to capture gestures, and so on.

The computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform the operations. The instructions may be provided by the computer-readable medium to the computing device 102 through a variety of different configurations.

One such configuration of a computer-readable medium is a signal bearing medium and thus is configured to transmit the instructions (e.g., as a carrier wave) to the hardware of the computing device, such as via the network 104. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 104 is illustrated as the Internet, the network may assume a wide variety of configurations. For example, the network 104 include a wide area network (WAN), a local area network (LAN), a wireless network, a public telephone network, an intranet, and so on. Further, although a single network 104 is shown, the network 104 may be configured to include multiple networks.

The computing device 102 is illustrated as including an object management module 106. The object management module 106 is representative of functionality to manage access to objects 108 by the computing device 102. For example, the object management module 106 may generate a user interface 110.

Through this user interface 110, the object management module 106 may manage access to a variety of different objects 108. For example, the object 108 may include operating system commands 112, data management commands 114, third-party commands 116 (e.g., from third-party plug-ins), files 118 (e.g., documents, applications, applets, and so on), and other objects 120. Further, the object management module 106 may be configured to manage remote objects, an example of which is illustrated as objects 122 made available by service provider 124 over the network 104.

The user interface 110 may be configured by the object management module 106 to support a variety of different techniques to provide access to the objects. For example, the object management module 106 may support techniques for "quick access" to objects selected by a user. In this way, a user may select favorite objects, e.g., object that are accessed often by the user, that may be provided in the user interface using techniques to enable the user to quickly launch the objects. An example of such a user interface 110 may be found beginning in relation to FIG. 2.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks. The features of the techniques described below are platform-independent, meaning that the techniques may be implemented on a variety of commercial computing platforms having a variety of hardware configurations.

Figure 2:
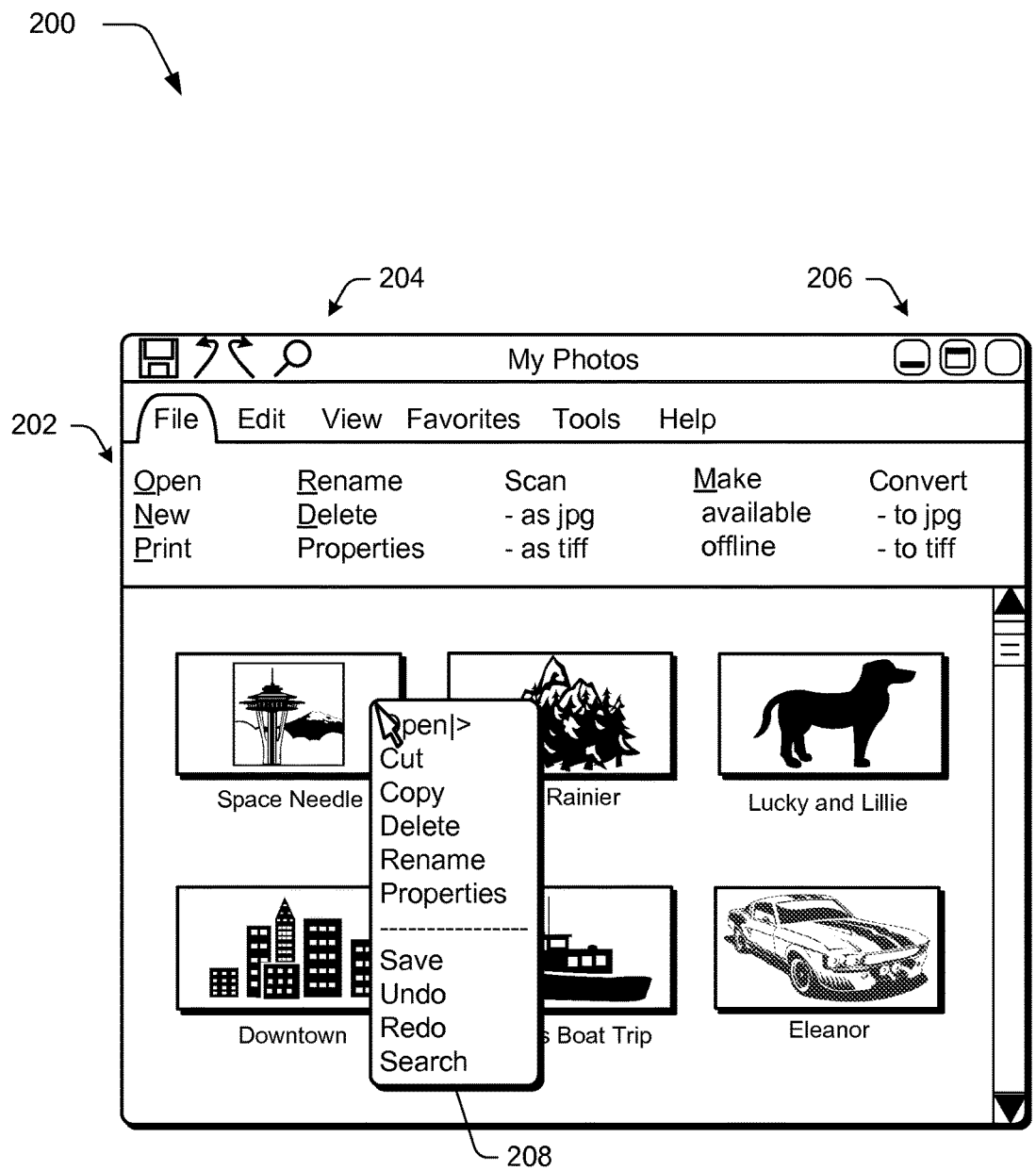
FIG. 2 is an illustration of a user interface in an example implementation configured to perform file management.

FIG. 2 is an illustration of a user interface 200 in an example implementation configured to perform file management. The user interface 200 as illustrated may be output by the computing device 102 and configured to perform file management techniques. For example, the object management module 106 may be incorporated as part of an operating system, an application that executes in conjunction with the operating system, a stand-alone application, and so on.

Regardless of where incorporated, the object management module 106 may employ techniques to manage objects 108, 112 accessible to the computing device 102.

The objects, for instance, may involve commands that may be executed by the computing device 102 to manage files and other objects. Examples of commands are illustrated a open, new, print, rename, delete, properties, scan, and so on. Other examples are also contemplated. Thus, the user interface 200 may provide techniques for accessing a file system of the computing device 102, such as to navigate through folders to locate files and other objects of interest.

Further, these examples are illustrated as displayed in a ribbon 202 in the user interface 200. The ribbon 202 in the illustrated example is disposed near a top of the user interface 200 and organized using tabs that are used to group commands, such as file, edit, view, favorites, tools, and help as shown. Selection of the tabs may thus cause representations of commands associated with that tab to be output. A user may then select a representation of a desired command to cause the command to be executed, e.g., by the computing device 102. The ribbon 202 may be configured to be modular and thus form sub-groups within the tabbed groups to further organize commands. The ribbon 202 may also be configured to be minimized such that the tabs but not the corresponding commands are illustrated or maximized such that the corresponding commands are shown.

The user interface 200 is also illustrated as including a toolbar 204 that is configured for quick access to objects. The toolbar 204 is configured in this example to persist along a top of the user interface 204 and as such is included as a part of a strip that includes an identification of a current location in a file hierarchy, e.g., a particular folder such as "My Photos" in the illustrated example. The strip also includes controls 206 to configure a window, illustrated examples of which include minimize, maximize, and close. In this way, the contents of the window may change without causing a change to the representations of the objects 204 included in the toolbar 204. Similar functionality may also be incorporated by the ribbon 202 without departing from the spirit and scope thereof.

The user interface 200 also includes a portion of view content with a respective "location" within a file hierarchy, at which, is currently being accessed. Examples of this in FIG. 2 are illustrated as images included in a "My Photos" folder of the computing device 102. Other implementations are also contemplated, such as to display representations of remote objects 122 accessible from a service provider 124 via the network 104 by a browser.

The toolbar 204 that provides one technique to enable "quick access" to objects, examples of which are illustrated as representations of commands that include save, undo, redo, and search. Another technique that may be used to provide "quick access" functionality is illustrated as a context menu 208. The context menu 208 in this example is output responsive to a right-click of an image of the space needle in this example. The context menu 208 includes a first section that includes representations of predefined objects, illustrated examples of which include open, cut, copy, delete, rename, and properties. For example, these objects may be predefined by a coder of the application (e.g., the file management application in this example) to include commands that have an increased likelihood of being utilized by a user. In this way, the user may quickly access the commands without navigating to the toolbar 204 because the context menu is generally output as disposed proximal to the cursor.

The context menu 208 may also be configured to include representations of objects specified by a user. Thus, the context menu 208 may be customized by a user to include desired objects. Further, representations of these desired object may be persisted between contexts such that the representation is output regardless of whether it is applicable to a current context, e.g., applicable to a current object being selected. For example, the representations may be disabled in contexts in which the represented object (e.g., command) does not apply to an object that is selected, e.g., via a right click.

In the illustrated user interface 200, functionality of the toolbar 204 is shared with the context menu 208 by the object management module 106. Thus, customization options in the user interface 200 may share this functionality. An example of this in FIG. 2 is that the context menu 208 includes representations of objects that are also included in the toolbar 204, although non-sharing examples are also contemplated. Further discussion of an example of how to add a representation of an object to the context menu 208 and/or the toolbar 204 may be found in relation to the following figure.

Figure 3:
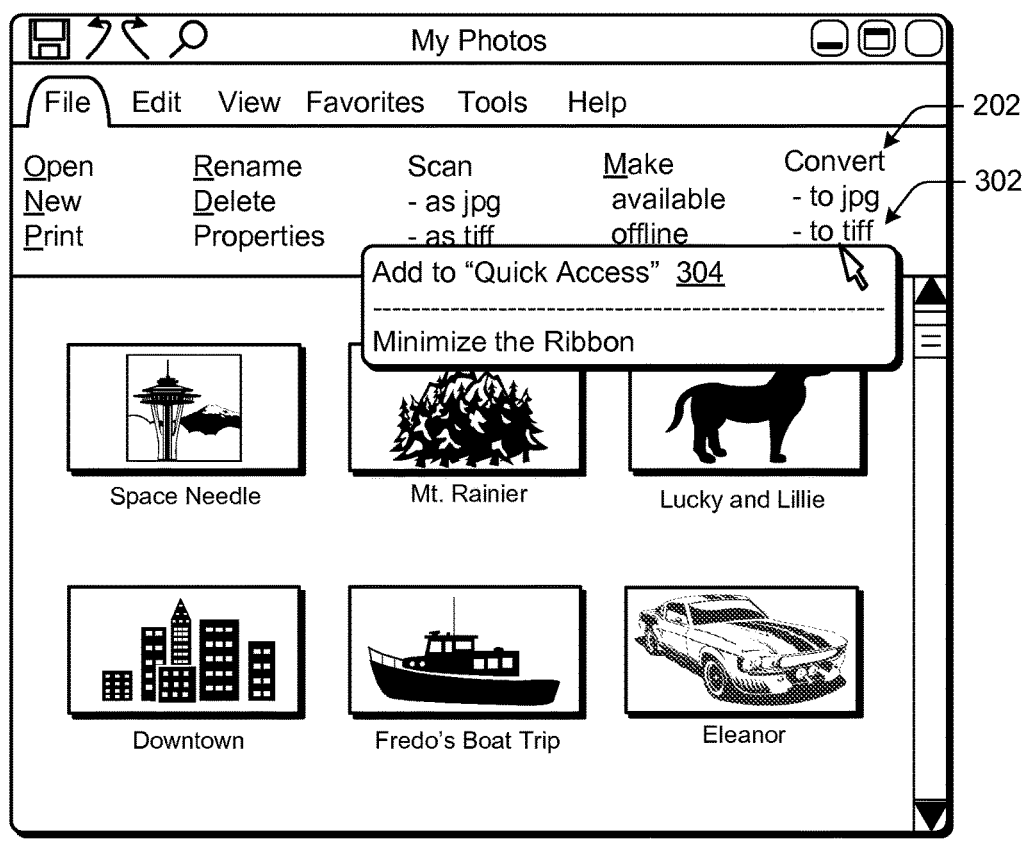
FIG. 3 is an illustration of a user interface in an example implementation in which a representation of an object is indicated using a right click, the indication causing an option to be output to add a representation of the object to a context menu.

FIG. 3 is an illustration of a user interface 300 in an example implementation in which a representation of an object is indicated using a right click, the indication causing an option to be output to add a representation of the object to a context menu. In this example, a cursor has been positioned proximal to a display of a representation 302 of a command "Convert to tiff." The cursor may be positioned in a variety of ways, such as a mouse, gesture (e.g., using touchscreen functionality or camera), or other cursor control device.

The representation of the command is selectable using a variety of different techniques. For example, a first technique may be used to initiate execution of the command, such as a double click performed by clicking a left button of a cursor control device, tap gesture, and so on. In another example, a second technique may be used to cause output of an option 304, such as through a right click performed by clicking a right button of a cursor control device, a two-fingered tap-and-hold gesture, and so on. Thus, although these techniques are referred to as double and right clicks, respectively, this refers to a convention and is therefore not limited to actual double and right clicks performed using buttons of a mouse.

The option 304 is illustrated as output using a pop-up menu to "Add to 'Quick Access.'" Selection of this option 304 may then cause the indicated representation (e.g., the representation of the command "Convert to tiff" in the ribbon 202) to be included in the context menu, an example of which may be found in relation to the following figure.

Figure 4:
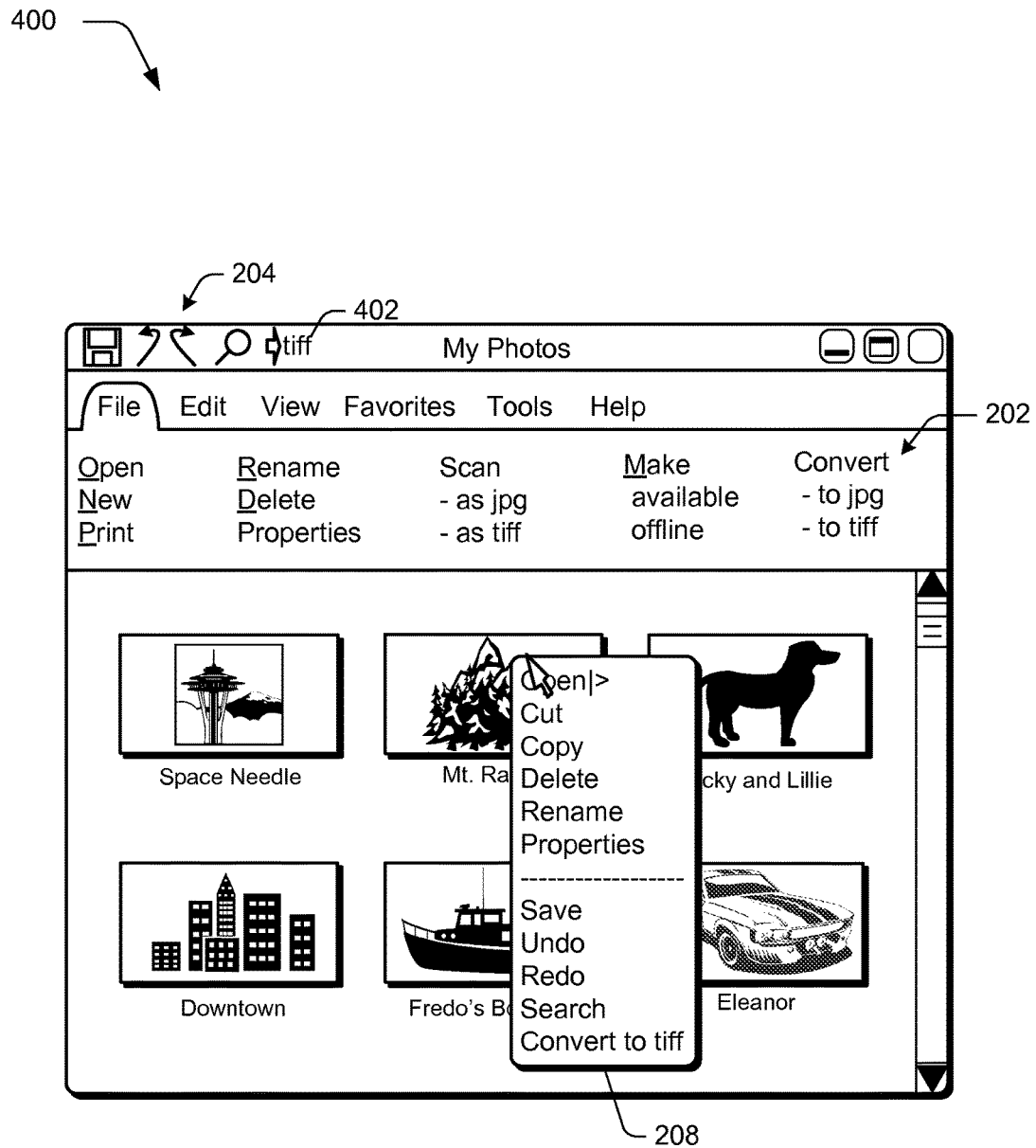
FIG. 4 is an illustration of a user interface in an example implementation in which a representation is added to a context menu in response to selection of the option displayed in the user interface of FIG. 3.

FIG. 4 is an illustration of a user interface 400 in an example implementation in which a representation is added to a context menu in response to selection of the option displayed in the user interface 300 of FIG. 3. In this example, a representation "Convert to tiff" has been added to the context menu 208 along with the other representations of user-selected objects and predefined objects. Thus, when a user initiates output of the context menu 208 (e.g., in response to a right click in the user interface 400), the context menu 208 may be displayed proximal to the cursor. Additionally, the content menu 208 may be configured to include representations of objects that may be initiated through selection in the menu without navigating away from a current location in the user interface 400, such as to the ribbon 202, toolbar 204, and so on.

Further, the object management module 106 may be configured to share functionality between the context menu 208 and the toolbar 204. Thus, a representation 402 of the command may also be included in the toolbar 204. In this way, the object management module 106 may leverage a command surface utilized to provide the ribbon 202 to enable quick access to objects in the context menu 208, which may be further unified with the toolbar 204 to conserve resources of the computing device 102. Additional discussion of the these techniques may be found in relation to the following procedures.

Example Procedures

The following discussion describes context menu techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the user interfaces 200-400 of FIGS. 2-4.

Figure 5:
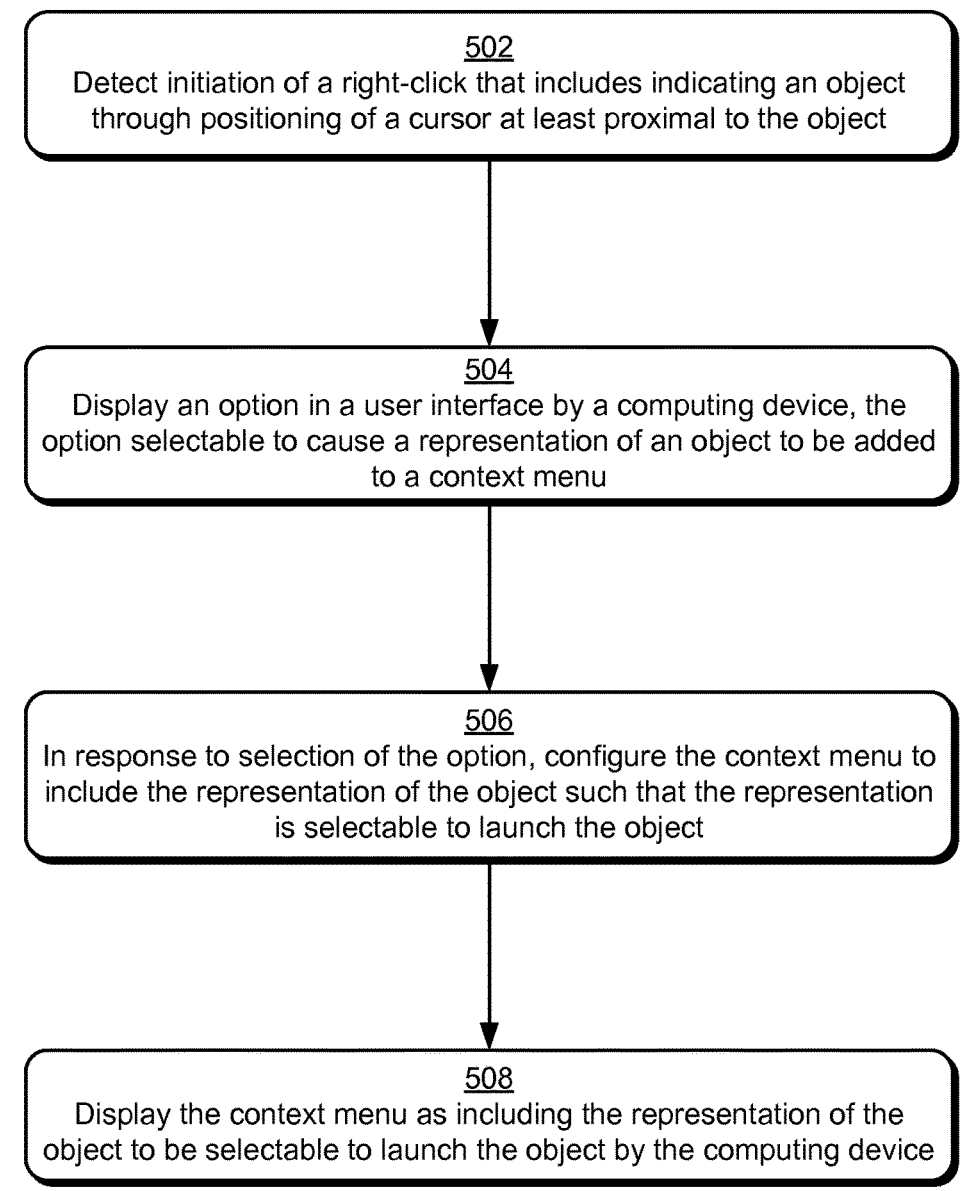
FIG. 5 is a flow diagram depicting a procedure in an example implementation in which an option is provided to add an object to a context menu.

FIG. 5 depicts a procedure 500 in an example implementation in which an option is provided to add an object to a context menu. Initiation of a right-click is detected that includes indicating an object through positioning of a cursor at least proximal to the object (block 502). A user, for instance, may make a gesture that involves placing two-fingers over a display of the representation of the object. A user may also utilize other cursor-control devices to perform the right click, such as a mouse, stylus, and so on. Thus, as previously stated the use of the terms "right click" is not limited to actual pressing of a right button of a mouse.

Further, as previously described a variety of different objects may be utilized. For instance, the object may be a command included in a ribbon 202, from an operating system, from a third-party plug-in, from an application, and so on. Further, the object may relate to a file, such as a document, application, spreadsheet, image, media, and so forth.

An option is displayed in user interface by a computing device, the option selectable to cause a representation of an object to be added to a context menu (block 504). The option, for instance, may be included in a pop-up menu that is displayed in response to a right click above. In other instances, the option may be included in a menu, in response to a key combination, and so forth.

In response to selection of the option, the context menu is configured to include the representation of the object such that the representation is selectable to launch the object (block 506). The context menu is then displayed as including the representation of the object to be selectable to launch the object by the computing device (block 508). The representation, for instance, may be included in the context menu that is also configured to be output in response to a right click. When output, selection of the representation may cause the corresponding object to be launched, such as performance of the command, initiation of an application, opening of a file, and so on by a computing device 102 or other device, such as at the service provider 124. A variety of different user interfaces may incorporate the functionality described herein, one example of which is described in relation to the following figure.

Figure 6:
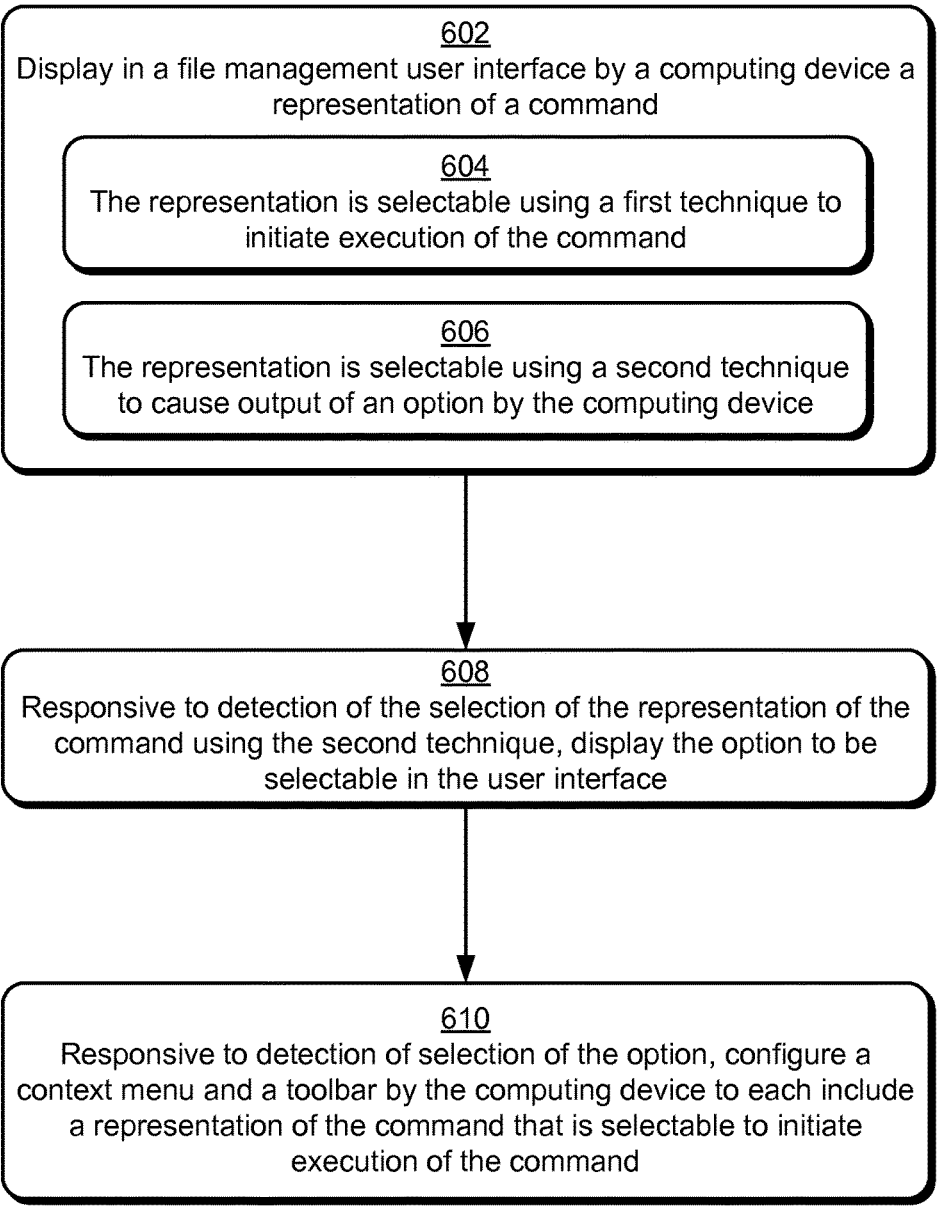
FIG. 6 is a flow diagram depicting a procedure in an example implementation in which a context menu and a toolbar of a file management user interface is customized to include a representation of an object selected by a user.

FIG. 6 depicts a procedure 600 in an example implementation in which a context menu and a toolbar of a file management user interface is customized to include a representation of an object selected by a user. A file management user interface is displayed by a computing device to include a representation of a command (block 602), such as to perform one or more file management techniques.

The representation is selectable using a first technique to initiate execution of the command (block 604), such as a double click by a cursor control device using a gesture, pressing a button, and so on. The representation is also selectable using a second technique to cause output of an option by the computing device (block 606), such as a right click by a cursor control device using a gesture, pressing a button, and so on.

Responsive to detection of the selection of the representation of the command using the second technique, the option is displayed to be selectable in the user interface (block 608). The option, for instance, may be included as a representation of a command in a pop-up menu to add the command for "quick access."

Responsive to detection of the selection of the option, a context menu and a toolbar are configured by the computing device to each include a representation of the command that is selectable to initiate execution of the command (block 610). As described in relation to FIG. 4, for instance, the user interface 400 may be configured to include an icon in the toolbar 204 and a textual description in the context menu 208 such that the command is readily accessible. Thus, in this example a user may customize the user interface for quick access using a variety of different techniques in a single operation.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
in a computing device displaying a user interface representation of a command, application or file, displaying an option in a displayed user interface by the computing device, wherein the option is selectable to cause a menu item representing the command, application or file to be added to a context menu; and
in response to selection of the option in the displayed user interface, configuring the context menu by the computing device to include the menu item representing the command, application or file such that the menu item representing the command, application or file is selectable to launch the command, application or file by the computing device;
wherein the displayed user interface representation of the command, application or file is selectable via the displayed user interface via a first technique to launch the command, application or file, and the same displayed user interface representation of the command, application or file is selectable via the displayed user interface via a second technique to cause the displaying of the option in the displayed user interface to cause the menu item representing the command, application or file to be added to the context menu.

2. A method as described in claim 1, wherein the first technique is a double click operation and the second technique is a right click operation.

3. A method as described in claim 1, wherein the user interface representation of the command, application or file is displayed in a ribbon menu.

4. A method as described in claim 1, wherein:
the command, application or file is selected through positioning of a cursor in the user interface as proximal to the user interface representation of the command, application or file; and
the displaying is performed responsive to detecting initiation of a right-click operation in conjunction with the positioning of the cursor.

5. A method as described in claim 1, wherein the command, application or file is a command.

6. A method as described in claim 5, wherein the command is a file management command.

7. A method as described in claim 1, wherein the command, application or file is a document file, spreadsheet file, image file, or media file.

8. A method as described in claim 1, wherein the context menu comprises menu items representing one or more predefined commands that are selectable via the context menu for initiation by the computing device.

9. A method as described in claim 1, further comprising:
in response to selection of the option, configuring a toolbar by the computing device to include a toolbar representation of the command, application or file.

10. The method of claim 1 wherein:
the user interface comprises a file management user interface configured for use in managing files and folders of the computing device;

the command, application or file comprises a command; and the command is executable to support management of the files and the folders of the computing device.

11. The method of claim 1 wherein:
the command, application or file comprises a command; and
the user interface representation of the command is included in a ribbon.

12. The method of claim 1 wherein:
the command is part of an operating system of the computing device or is part of third-party software of the computing device.

13. The method of claim 1 further comprising:
invoking the context menu using the second technique.

14. An apparatus comprising:
one or more processors;
memory, coupled to the one or more processors, comprising instructions executable by the one or more processors to implement:
in a displayed user interface, displaying a representation of a command, application or file that is selectable using:
a first user interface interaction technique to launch the command, application or file by a computing device; and
a second user interface interaction technique to cause output of an option by the computing device;
responsive to detection of selection of the representation of the command, application or file in the displayed user interface using the second user interface interaction technique, displaying the option to be selectable in the displayed user interface by the computing device to cause a menu item representing the command, application or file to be included in a context menu.

15. The apparatus as described in claim 14, wherein the context menu is configured to be output in the user interface responsive to a right-click.

16. The apparatus as described in claim 14, wherein the command, application or file is a document file, spreadsheet file, image file, or media file.

17. The apparatus as described in claim 14, wherein the command, application or file is a command.

18. The apparatus as described in claim 14, the instructions further executable to implement:
in response to selection of the option, configuring a toolbar by the computing device to also include a toolbar representation of the command, application or file.

19. The apparatus of claim 14 wherein:
the first user interface interaction technique is a double click and the second user interface interaction technique is a right click.

20. The apparatus as described in claim 14, wherein the representation of the command, application or file is displayed in a ribbon menu.

21. A method comprising:
in a user interface of a computing device, displaying a user interface representation of a command;
responsive to receiving selection of the user interface representation of the command via a first user interface interaction technique, performing the command;
responsive to receiving selection of the user interface representation of the command via a second user interface interaction technique different from the first user interface interaction technique, displaying an option to add the command to a context menu;
in response to selection of the option to add the command, adding a first menu item representing the command to the context menu;
in the user interface of the computing device, displaying a user interface representation of a file;
responsive to receiving selection of the user interface representation of the file via the first user interface interaction technique, opening the file;
responsive to receiving selection of the user interface representation of the file via the second user interface interaction technique different from the first user interface interaction technique, displaying an option to add the file to the context menu;
in response to selection of the option to add the file, adding a second menu item representing the file to the context menu; and
responsive to invocation of the context menu, displaying the context menu in the user interface, wherein the context menu comprises the first menu item and the second menu item, and wherein selecting the first menu item performs the command, and the second menu item opens the file.

22. The method of claim 21 wherein:
further in response to selection of the option to add the command, also adding a representation of the command to a toolbar of the user interface of the computing device.

* * * * *